United States Patent
Sakai et al.

(10) Patent No.: US 7,952,312 B2
(45) Date of Patent: May 31, 2011

(54) CLOSURE PANEL CONTROL APPARATUS

(75) Inventors: Shin Sakai, Toyohashi (JP); Takahiro Sumiya, Toyohashi (JP)

(73) Assignee: Asmo Co., Ltd., Shizuoka-pref. (JP)

( * ) Notice: Subject to any disclaimer, the term of this patent is extended or adjusted under 35 U.S.C. 154(b) by 379 days.

(21) Appl. No.: 12/230,220

(22) Filed: Aug. 26, 2008

(65) Prior Publication Data

US 2009/0058340 A1 Mar. 5, 2009

(30) Foreign Application Priority Data

Aug. 28, 2007 (JP) ................................. 2007-220690
Jul. 22, 2008 (JP) ................................. 2008-188740

(51) Int. Cl.
*H02P 7/28* (2006.01)

(52) U.S. Cl. ........ 318/434; 318/469; 318/476; 318/256; 318/257

(58) Field of Classification Search .................. 318/434, 318/469, 476, 256, 257
See application file for complete search history.

(56) References Cited

U.S. PATENT DOCUMENTS

| | | | | | |
|---|---|---|---|---|---|
| 5,530,329 | A | * | 6/1996 | Shigematsu et al. | 318/469 |
| 6,274,947 | B1 | * | 8/2001 | Terashima | 307/10.1 |
| 6,967,451 | B2 | * | 11/2005 | Miyauchi | 318/443 |
| 7,250,736 | B2 | * | 7/2007 | Hirai | 318/266 |
| 2007/0052293 | A1 | | 3/2007 | Shibata et al. | |

FOREIGN PATENT DOCUMENTS

| JP | A-H09-32414 | 2/1997 |
|---|---|---|
| JP | A-H09-125815 | 5/1997 |
| JP | A-2007-100483 | 4/2007 |

* cited by examiner

*Primary Examiner* — Walter Benson
*Assistant Examiner* — David S Luo
(74) *Attorney, Agent, or Firm* — Posz Law Group, PLC (57) ABSTRACT

A controller computes a pinching amount of an object caused by a window glass. The controller estimates a prior pinching amount of the object caused by the window glass before the controller computes the pinching amount of the object. The controller confirms occurrence of the pinching of the object based on the computed pinching amount and the estimated prior pinching amount of the object.

7 Claims, 7 Drawing Sheets

CLOSURE PANEL CONTROL APPARATUS

CROSS REFERENCE TO RELATED APPLICATION

This application is based on and incorporates herein by reference Japanese Patent Application No. 2007-220690 filed on Aug. 28, 2007 and Japanese Patent Application No. 2008-188740 filed on Jul. 22, 2008.

BACKGROUND OF THE INVENTION

1. Field of the Invention

The present invention relates to a closure panel control apparatus, particularly, a closure panel control apparatus, which can sense pinching of an object caused by a closure panel.

2. Description of Related Art

Lately, a closure panel control apparatus of a vehicle often has a pinching limiting function. Specifically, the closure panel control apparatus senses pinching of an object between a closure panel and a frame during a closing movement of the closure panel based on a change in a rotational speed of an electric motor, which drives the closure panel. When the pinching of the object is sensed, the closure panel control apparatus immediately stops the closing movement of the closure panel and executes an opening movement of the closure panel by reversing rotation of the electric motor.

In one exemplary control operations a threshold value is set for measurement data (e.g., a rotational speed of a drive electric motor of a power window apparatus that drives a window glass to open or close the same), which is measured in response to the load applied to the window glass. Then, the pinching of the object is sensed in view of the threshold value.

However, in the case of the previously propose sensing method, an increase of the pinching load is transmitted to the motor through a resilient body, such as a resilient component of a regulator, so that, for example, a motor rotational period and a motor rotational speed do not change simultaneously with the occurrence of the pinching, thereby resulting in a delay in the sensing of the pinching and an increase in the sensed load. As a result, a significant damage may possibly be applied to the pinched object.

In order to address the above disadvantage, Japanese Unexamined Patent Publication No. 2007-070949 (corresponding to US 2007/0052293A1) teaches a technique of correcting a change start position of a motor rotational speed in view of a delay in sensing of pinching of an object.

According to the technique of Japanese Unexamined Patent Publication No. 2007-070949, the occurrence of the pinching is determined in view of the estimated prior pinching amount of the object, the pinching of which has started before the sensing of the pinching amount of the object takes place. Thus, it is possible to avoid the application of the excessive pinching load and the long pinched state of the object.

That is, the pinching amount, which is not directly sensed with the pinching amount sensing means, is estimated with the pinching amount estimating means. The pinching determining means determines the pinching based on the pinching amount, which is sensed with the pinching amount sensing means, and the estimated prior pinching amount, which is estimated with the pinching amount estimating means.

In this way, the pinching can be sensed reliably. Also, the pinching can be sensed earlier by the amount of time, which corresponds to the estimated pinching amount. Thereby, it is possible to avoid keeping the pinched object in the pinched state.

However, in the case of the technique of Japanese Unexamined Patent Publication No. 2007-070949, when an external disturbance (e.g., a closing movement of a vehicle door) occurs during an upward movement of the window glass, a possibility of making an erroneous sensing of pinching is increased in comparison to a case where the correction using the above estimated pinching amount is not made.

SUMMARY OF THE INVENTION

The present invention addresses the above disadvantage. Thus, it is an objective of the present invention to provide a closure panel control apparatus, which can limit occurrence of erroneous sensing of pinching of an object caused by a closure panel even at time of occurrence of an external disturbance during a drive operation of the closure panel and which can correct a delay in sensing a load applied to the pinched object.

To achieve the objective of the present invention, there is provided a closure panel control apparatus for a vehicle. The closure panel control apparatus includes a door, a closure panel, a drive unit and a pinching sensing unit. The closure panel is provided to the door. The drive unit drives the closure panel to open and close the closure panel. The pinching sensing unit senses pinching of an object caused by the closure panel at time of driving the closure panel by the drive unit. The pinching sensing unit includes a pinching amount computing means, a pinching amount estimating means, a pinching determining means and a door state sensing means. The pinching amount computing means is for computing a pinching amount of the object caused by the closure panel. The pinching amount estimating means is for estimating a prior pinching amount of the object caused by the closure panel before the pinching amount computing means computes the pinching amount of the object. The pinching determining means is for confirming occurrence of the pinching of the object based on the computed pinching amount, which is computed by the pinching amount computing means, and the estimated prior pinching amount of the object, which is estimated by the pinching amount estimating means. The door state sensing means is for sensing a current state of the door, which is one of an open state and a close state of the door. The pinching amount estimating means determines whether generation of an external disturbance exists at the time of driving the closure panel by the drive unit. When the pinching amount estimating means determines that the generation of the external disturbance exists at the time of driving the closure panel, the pinching amount estimating means corrects the estimated prior pinching amount of the object based on the sensed external disturbance and corrects the computed pinching amount of the object, which is computed by the pinching amount computing means, based on the sensed current state of the door.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

An embodiment of the present invention will be described with reference to the accompanying drawings.

A power window apparatus of a vehicle 100 according to an embodiment of the present invention will be described.

Figure 1:
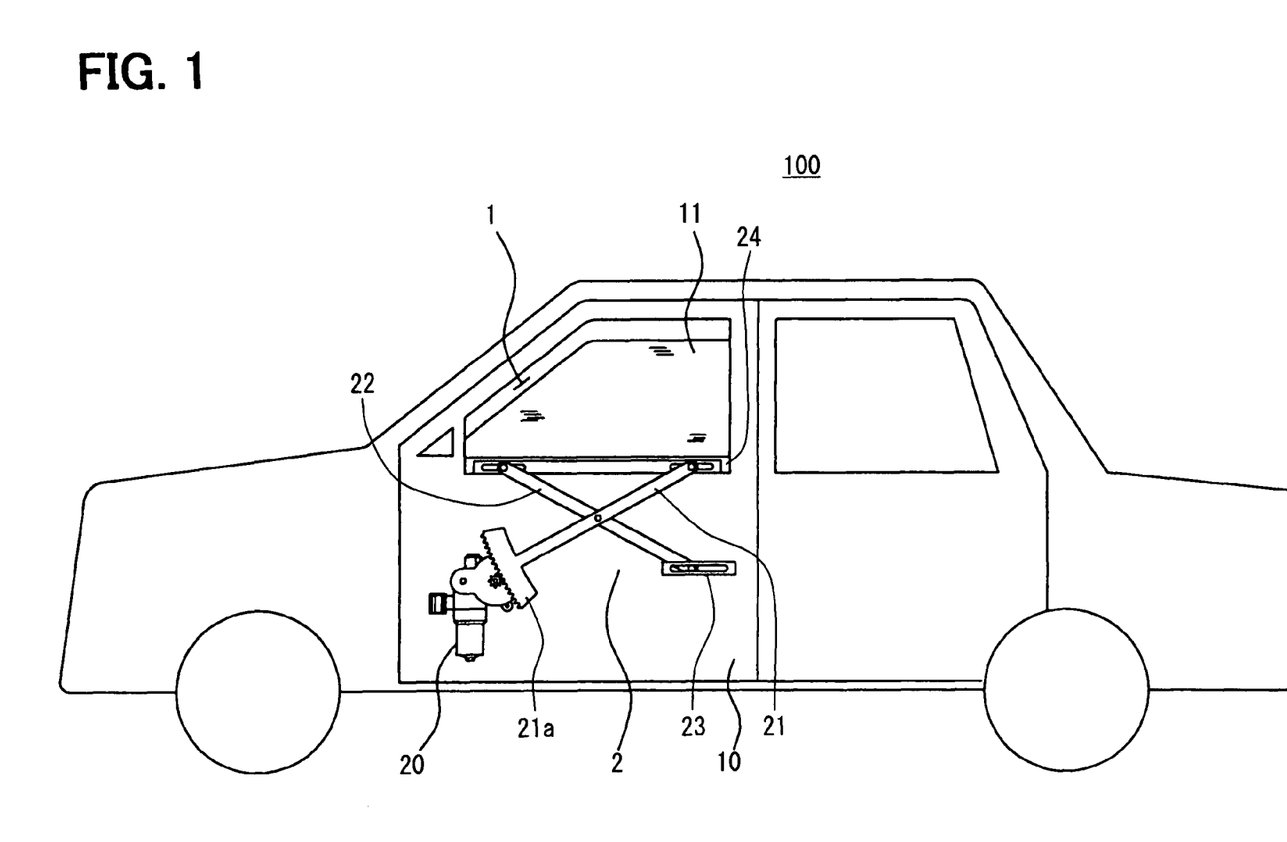
FIG. 1 is a schematic view of a power window apparatus installed in a door of a vehicle according to an embodiment of the present invention.
Figure 2:
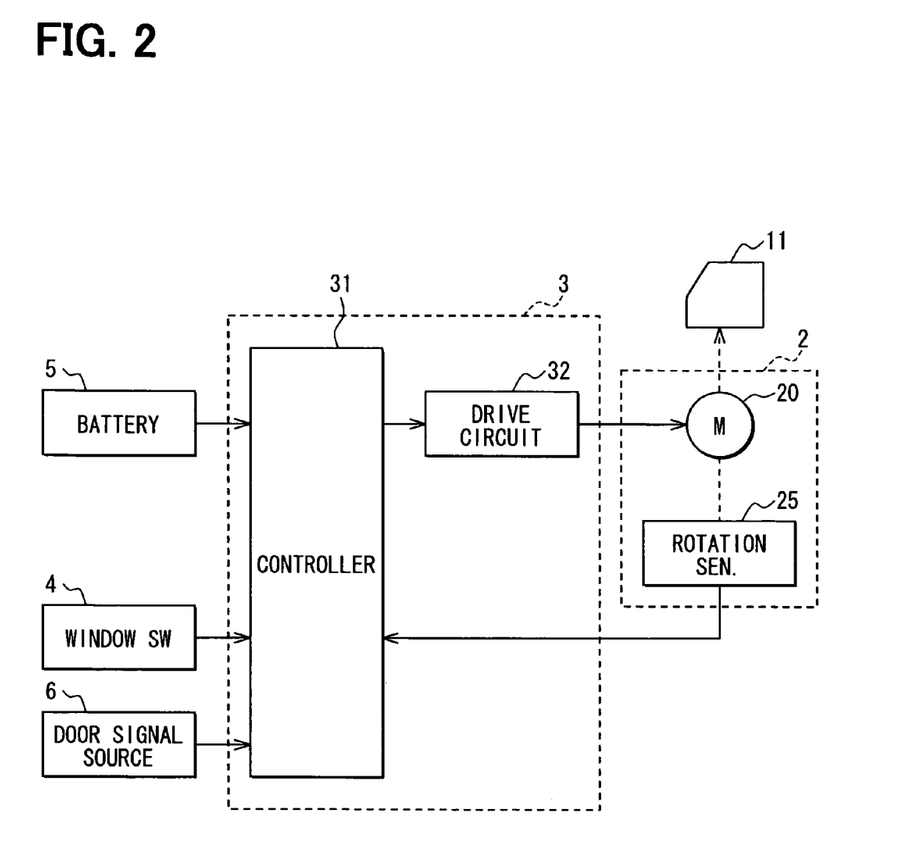
FIG. 2 is a diagram showing an electrical structure of the power window apparatus shown in FIG. 1.

FIG. 1 is a schematic view of the power window apparatus 1 of the present embodiment, and FIG. 2 is a diagram showing an electrical structure of the power window apparatus 1.

In the power window apparatus 1 of the present embodiment, an electric motor 20 is rotated to lower or raise a window glass 11, i.e., to execute an opening or closing movement of the window glass 11. The window glass 11 serves as a closure panel (an opening and closing body) provided in a door 10 of the vehicle 100. The power window apparatus 1 includes a lifting mechanism 2, a control unit 3 and a manipulation switch (a window switch) 4. The lifting mechanism 2 lowers and raises the window glass 11 to open and close the window glass 11. The control unit 3 controls the operation of the lifting mechanism 2. An occupant of the vehicle operates the manipulation switch 4 to commands the operation.

In the present embodiment, the window glass 11 is lowered and raised along a rail (not shown) between a full close position at an upper side and a full open position at a lower side.

The lifting mechanism 2 of the present embodiment includes the motor 20, a liftable arm 21, a driven side arm 22, a stationary channel 23 and a glass side channel 24. The motor 20 is fixed to the door 10 and includes a speed reducing mechanism. The liftable arm 21 includes a fan-shaped gear 21a, which is driven by the motor 20. The driven side arm 22 is pivotably supported such that the liftable arm 21 and the driven side arm 22 cross with each other in an X-form. The stationary channel 23 is fixed to the door 10. The glass side channel 24 is integral with the window glass 11.

The motor 20 of the present embodiment receives an electric power from the control unit 3, so that windings (coils) of the armature are powered, and thereby a magnetically attracting action takes place between the armature and a stator having magnets. As a result, the armature is rotated forward or backward. In the lifting mechanism 2 of the present embodiment, when the liftable arm 21 and the driven side arm 22 are swung in response to the rotation of the motor 20, a slide movement of each end of the liftable arm 21 and a slide movement of each end of the driven side arm 22 are limited by the channels 23, 24. Thereby, the liftable arm 21 and the driven side arm 22 are driven as an X-link to lower or raise the window glass 11. The lifting mechanism 2 serves as a drive unit of the present invention.

The motor 20 of the present embodiment integrally includes a rotation sensing device (a position sensing device) 25, which serves as a moving speed sensing means. The rotation sensing device 25 outputs pulse signals (a speed measurement signal and a rotational speed signal), which are synchronized with the rotation of the motor 20, to the control unit 3.

The rotation sensing device 25 of the present embodiment senses a change in the magnetism of a magnet, which is rotated together with an output shaft of the motor 20, with a plurality of Hall elements.

With the above construction, the rotation sensing device 25 outputs the pulse signals, which are synchronized with the rotation of the motor 20.

That is, the pulse signal is outputted every predetermined moving distance of the window glass 11 or every predetermined rotational angle of the motor 20.

In this way, the rotation sensing device 25 can output the signals that correspond to the movement of the window glass 11, which is generally proportional to the rotational speed of the motor 20.

The control unit 3 computes the vertical position of the window glass 11 based on the pulse signals.

Furthermore, the control unit 3 can compute the rotational speed of the motor 20 or the moving speed of the window glass 11 based on intervals of the pulse signals.

In the present embodiment, the Hall elements are used in the rotation sensing device 25. However, the present invention is not limited to this construction. Specifically, as long as the rotational speed of the motor 20 can be sensed, any known suitable sensing device, such as an encoder, may be used as the rotation sensing device of the present invention. Also, the rotation sensing device may sense the rotational speed by sensing a torque ripple at the time of rotation of the motor 20.

The control unit 3 of the present embodiment includes a controller 31 and a drive circuit 32. A necessary electric power is supplied from a battery 5 of the vehicle to the controller 31 and the drive circuit 32. The controller 31 serves as a pinching sensing unit of the present invention.

The controller 31 of the present embodiment includes a microcomputer, which has a CPU, memories (e.g., a ROM, a RAM), an input circuit and an output circuit. The CPU, the memories, the input circuit and the output circuit are interconnected through a bus line. The structure of the controller 31 is not limited to the above described one. For example, a DSP or a gate array may be used to construct the controller 31.

The controller 31 drives the motor 20 in the normal direction or the reverse direction through the drive circuit 32 based on a manipulation signal outputted from the manipulation switch 4 to execute the opening or closing movement of the window glass 11.

Furthermore, the controller 31 can sense pinching of an object between an upper end portion of the window glass 11 and a window frame based on pulse signals, which are received from the rotation sensing device 25. When the pinching of the object caused by the window glass 11 is sensed, the controller 31 drives the motor 20 in the opening direction through the drive circuit 32 to open, i.e., to lower the window glass 11.

A door signal (a door open/close state signal) is supplied from a door signal source 6 to the controller 31.

The door signal source 6, which outputs the door signal, may be, for example, a courtesy switch, a door latch sensor, any other known contact or contactless sensor provided at the door 10. The controller 31 determines whether the door 10 is in the open state or the close state based on the door signal.

The door signal is used in a correction operation for correcting a change amount S of a rotational speed ω in view of an estimated pinching amount in a delay period Td before making determination of the start of pinching of an object. This operation will be described in detail latter.

The drive circuit 32 of the present embodiment includes an IC having FET's and changes a polarity of the electric power supplied to the motor 20 based on the input signal from the controller 31.

Specifically, when the drive circuit 32 receives a normal rotation command signal from the controller 31, the drive circuit 32 supplies the electric power to the motor 20 to rotate the motor 20 in the normal direction. In contrast, when the drive circuit 32 receives a reverse rotation command signal from the controller 31, the drive circuit 32 supplies the electric power to the motor 20 to rotate the motor 20 in the reverse direction.

Alternatively, the drive circuit 32 may be constructed to change the polarity using a relay circuit. Furthermore, the drive circuit 32 may be integrated in the controller 31.

The controller 31 senses leading edges and trailing edges (pulse edges) of the received pulse signals. The controller 31 computes the rotational speed (rotational period) of the motor 20 based on intervals (periods, pulse widths) of the pulse edges and senses the rotational direction of the motor 20 based on a phase difference of each pulse signal.

That is, the controller 31 indirectly computes the moving speed of the window glass 11 based on the rotational speed (rotational period) of the motor 20 and determines the moving direction of the window glass 11 based on the rotational direction of the motor 20.

Furthermore, the controller 31 counts the pulse edges. This pulse count value is incremented or decremented in response to the opening or closing movement of the window glass 11. The controller 31 determines the position of the window glass 11 based on the degree of the pulse count value.

The manipulation switch 4 of the present embodiment is a rocker switch, which is operable in two steps and includes an opening switch, a closing switch and an automatic switch. When the occupant operates the manipulation switch 4, a command signal for executing the opening or closing movement of the window glass 11 is outputted from the manipulation switch 4 to the controller 31.

More specifically, when the manipulation switch 4 is manipulated in one step toward one end side thereof, the opening switch is turned on. Thus, a normal opening command signal for executing a normal opening movement of the window glass 11 (for executing an opening movement of the window glass 11 only through a period of manipulating the manipulation switch 4) is outputted from the manipulation switch 4 to the controller 31. Furthermore, when the manipulation switch 4 is manipulated in one step toward the other end side thereof, the closing switch is turned on. Thus, a normal closing command signal for executing a normal closing movement of the window glass 11 (for executing a closing movement of the window glass 11 only through a period of manipulating the manipulation switch 4) is outputted from the manipulation switch 4 to the controller 31.

Furthermore, when the manipulation switch 4 is manipulated in two steps toward the one end side thereof, the opening switch and the automatic switch are both turned on. Thus, an automatic opening command signal for executing an automatic opening movement of the window glass 11 (for executing an opening movement of the window glass 11 all the way to a full open position regardless of whether the manipulation of the manipulation switch 4 is stopped) is outputted from the manipulation switch 4 to the controller 31. Also, when the manipulation switch 4 is manipulated in two steps toward the other end side thereof, the closing switch and the automatic switch are both turned on. Thus, an automatic closing command signal for executing an automatic closing movement of the window glass 11 (for executing a closing movement of the window glass 11 all the way to a full close position regardless of whether the manipulation of the manipulation switch 4 is stopped) is outputted from the manipulation switch 4 to the controller 31.

The controller 31 drives the motor 20 through the drive circuit 32 throughout the period of receiving the normal opening command signal from the manipulation switch 4 (throughout the period of manipulating the manipulation switch 4) to execute the normal opening movement of the window glass 11. In contrast, the controller 31 drives the motor 20 through the drive circuit 32 throughout the period of receiving the normal closing command signal from the manipulation switch 4 (throughout the period of manipulating the manipulation switch 4) to execute the normal closing movement of the window glass 11.

Furthermore, when the controller 31 receives the automatic opening command signal from the manipulation switch 4, the controller 31 drives the motor 20 through the drive circuit 32 to execute the automatic opening movement of the window glass 11 all the way to the full open position. Also, when the controller 31 receives the automatic closing command signal from the manipulation switch 4, the controller 31 drives the motor 20 through the drive circuit 32 to execute the automatic closing movement of the window glass 11 all the way to the full close position.

The controller 31 monitors occurrence of the pinching of the object between the window glass 11 and the window frame when the closing movement of the window glass 11 (the normal closing movement and automatic closing movement) is executed. Specifically, when the pinching occurs, the moving speed of the window glass 11 and the rotational speed of the motor 20 are reduced (lengthening of the rotational period). Thus, the controller 31 of the present embodiment always monitors the change in the rotational speed of the motor 20.

The controller 31 first senses start of the pinching based on the change in the rotational speed of the motor 20. Then, when the controller 31 senses a predetermined amount of change in the rotational speed of the motor 20 since the time of sensing the start of the pinching, the controller 31 determines, i.e., confirms that the pinching has occurred.

Then, when the pinching is confirmed, the controller 31 drives the motor 20 in the reverse direction to release the pinched object from the window glass 11, so that the window glass 11 is opened by a predetermined amount.

Alternatively, when the occurrence of the pinching is confirmed, the controller 31 may stop the further closing movement of the window glass 11 by stopping the motor 20 to enable releasing of the pinched object from the window glass 11.

A flow of the pinching determination operation of the power window apparatus 1 according to the present embodiment will be described.

In the power window apparatus 1 of the present embodiment, the rotational speed $\omega$ of the motor 20 is computed based on the pulse singles received from the rotation sensing device 25.

Specifically, in the computation process of the present embodiment, the rotational speed $\omega$ of the motor 20 is computed based on the pulse widths of a current pulse single and previous consecutive pulse singles (the number of the previous pulses signals is "n") received before the current pulse signal. When the rotational speed $\omega$ is computed based on the multiple pulse singles, an erroneously determined change in the rotational speed of the motor 20 can be reduced or eliminated in the data processing.

A change in the rotational speed $\omega$, which is computed in the above described manner, is monitored. At the time of sensing the pinching of the object, the rotational speed $\omega$ of the motor 20 is reduced by the pinching of the object in the middle of the closing movement of the window glass 11.

Furthermore, in the power window apparatus 1 of the present embodiment, every time when the pulse signal is received, a rotational speed difference $\Delta\omega$, which is a difference between the current rotational speed $\omega$ and the previous rotational speed $\omega$, is computed. Here, the previous rotational speed $\omega$ is a rotational speed, which is obtained "k" pulse(s) before the current pulse ("k" denotes the number of pulses and is four in the present embodiment).

First, it is determined whether the rotational speed difference $\Delta\omega$, which is computed in the above described manner, exceeds a change determination threshold value $\alpha$. When the rotational speed difference $\Delta\omega$ exceeds the change determination threshold value $\alpha$, it is determined that the pinching is started.

However, at this time point, the pinching has not been confirmed yet, so that the rotation of the motor 20 is maintained, and thereby the window glass 11 maintains the upward movement. The change determination threshold value $\alpha$ is set such that even when the power window apparatus 1 pinches a soft object, the rotational speed difference $\Delta\omega$, which is caused by the pinching of the soft object, exceeds the change determination threshold value $\alpha$.

In the present embodiment, the rotational speed difference $\Delta\omega$ is the difference between the current rotational speed $\omega$ and the previous rotational speed $\omega$ (obtained k pulses before the current pulse), which are computed based on the consecutive pulse signals. Therefore, a delay from the actual rotational speed difference $\Delta\omega$ occurs in the computed rotational speed difference $\Delta\omega$ by the amount, which corresponds to a predetermined number of signals (delay pulse signals).

That is, the time of sensing of the start of the pinching in the data processing is delayed by a predetermined time period from the actual time of the start of the pinching.

Thus, at the time of exceeding of the rotational speed difference $\Delta\omega$ beyond the change determination threshold value $\alpha$, the actual pinching has been already started since the time point in the past, which differs from the current time by the amount that corresponds to the delay pulse signals. Thereby, the pinching load has been already applied to the pinched object.

Furthermore, in the present embodiment, once the start of the pinching is sensed, a cumulative value $\Sigma\Delta\omega\alpha$ of the rotational speed differences $\Delta\omega$, which have been computed since the time of sensing the start of the pinching, is computed. The cumulative value $\Sigma\Delta\omega\alpha$ of the rotational speed differences $\Delta\omega$ is the amount of change in the rotational speed $\omega$ and is hereinafter referred to as a rotational speed change amount $\Sigma\Delta\omega\alpha$.

Specifically, the rotational speed change amount $\Sigma\Delta\omega$ is computed as a sum of the rotational speed differences $\Delta\omega$, which have been obtained since the time of sensing the start of the pinching.

In the present embodiment, the rotational speed change amount $\Sigma\Delta\omega\alpha$ is used as a computed pinching amount, which is used to determine a state (a pinching state) or a degree of pinching from the time of determining the start of the pinching upon exertion of the influence on the rotational speed difference $\Delta\omega$ caused by the pinching of the object to the time of sensing (confirming) the pinching upon increasing of the pinching load.

Furthermore, in the present embodiment, there is executed an estimation process for estimating the cumulative value $\Sigma\Delta\omega\beta$ of the rotational speed differences $\Delta\omega$ (hereinafter, referred to as the rotational speed change amount $\Delta\omega$, which corresponds to the delay pulse number (i.e., the number of the delay pulses) described above.

Specifically, there is computed an average rotational speed difference $\Delta\omega ave$ that is an average of the rotational speed differences $\Delta\omega$ from the current rotational speed difference $\Delta\omega$ to the previous rotational speed difference $\Sigma\Delta\omega\beta$, which is computed p pulse signals before the current pulse signal. Then, this average rotational speed difference $\Delta\omega ave$ is regarded as the rotational speed difference in the delay period. The rotational speed change amount $\Sigma\Delta\omega\beta$ in the delay period is computed by multiplying the delay pulse signal number to the average rotational speed difference $\Delta\omega ave$.

In the present embodiment, a correction is made in view of an external disturbance(s), which influences the rotational speed change amount $\Sigma\Delta\omega\beta$ in the delay period.

Specifically, the external disturbances, which influence the rotational speed change amount $\Sigma\Delta\omega\beta$, may include ordinary disturbances, such as a slide resistance, a change caused by aging, the vehicle speed, operation of electric devices (e.g., a starter, a wiper), the vibrations of the vehicle during traveling of the vehicle, a change in a drive voltage of the motor of the power window apparatus. The correction is made by selecting and multiplying the delay pulse signal number, which corresponds to the corresponding external disturbance, to the rotational speed change amount $\Sigma\Delta\omega\beta$.

FIGS. 3A to 6B show the states of the speed change caused by the various external disturbances for the case with the delay load correction and for the case without the delay load correction.

Figure 3A:
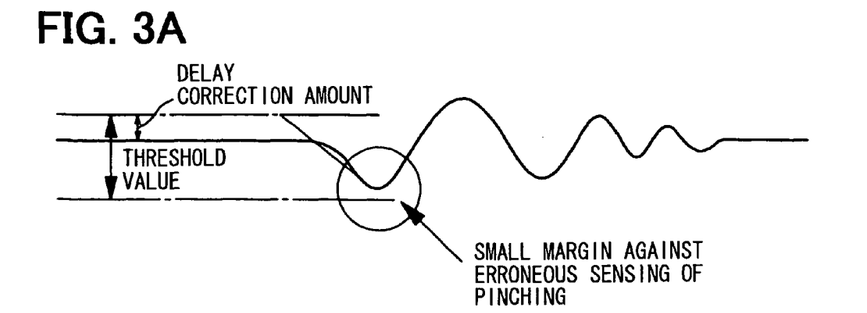
FIG. 3A is a diagram showing a rotational speed change of a motor in a case of closing a vehicle door during an upward movement of a window glass while a delay load correction is made.
Figure 3B:
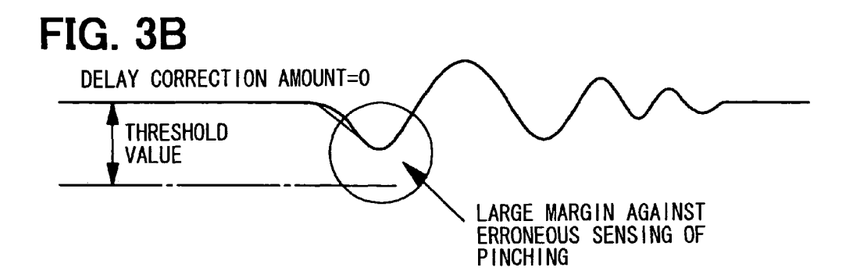
FIG. 3B is a diagram showing a rotational speed change of the motor in the case of closing the vehicle door during the upward movement of the window glass while the delay load correction is not made.
Figure 4A:
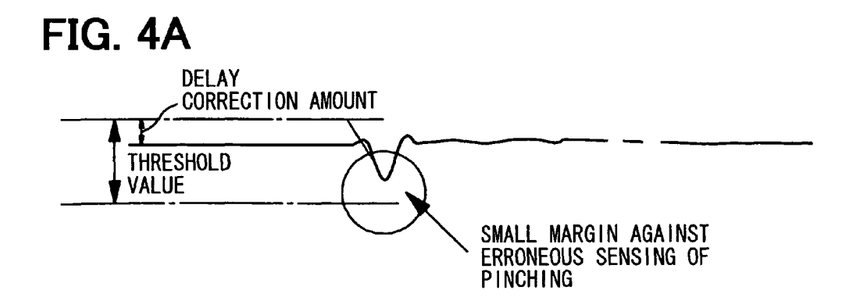
FIG. 4A is a diagram showing a rotational speed change of the motor at the time of engine start while a delay load correction is made.
Figure 4B:
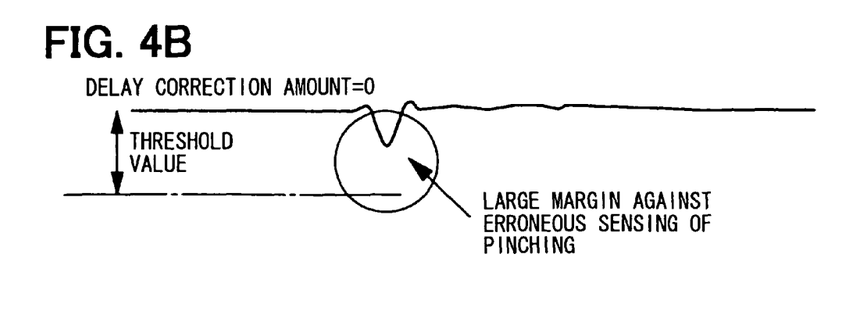
FIG. 4B is a diagram showing a rotational speed change of the motor at the time of engine start while the delay load correction is not made.
Figure 5A:
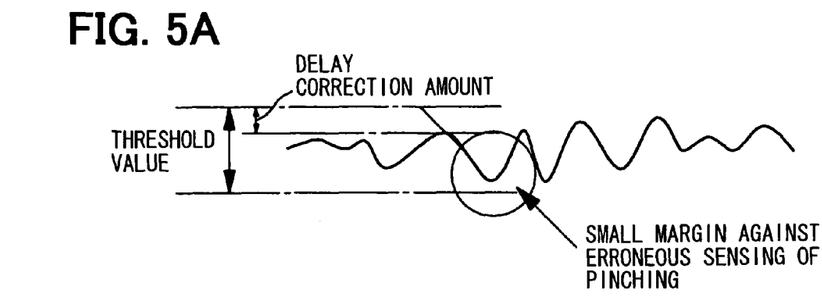
FIG. 5A is a diagram showing a rotational speed change of the motor at the time of driving the vehicle on a rough road while a delay load correction is made.
Figure 5B:
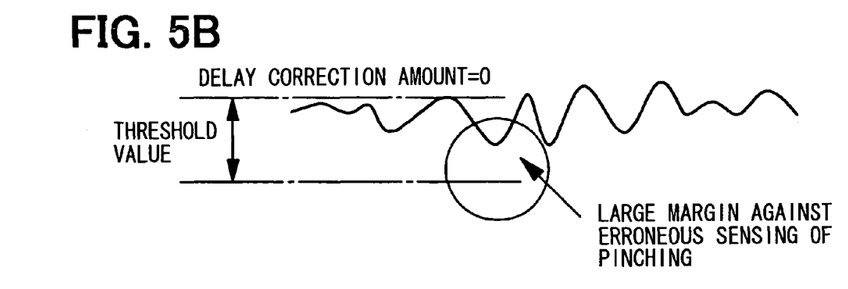
FIG. 5B is a diagram showing a rotational speed change of the motor at the time of driving the vehicle on the rough road while the delay load correction is not made.
Figure 6A:
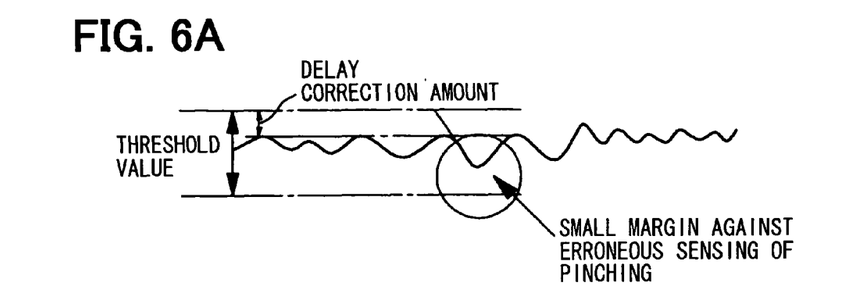
FIG. 6A is a diagram showing a rotational speed change of the motor at the time of exerting a slide resistance while a delay load correction is made.
Figure 6B:
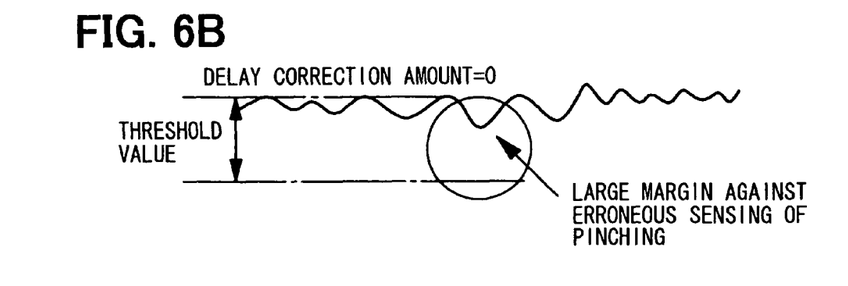
FIG. 6B is a diagram showing a rotational speed change of the motor at the time of exerting the slide resistance while the delay load correction is not made.

Specifically, FIGS. 3A and 3B show the rotational speed change in the case where the closing movement of the vehicle door is executed during the raising movement of the window glass 11. FIGS. 4A and 4B show the rotational speed change in the case of the engine start time. FIGS. 5A and 5B show the rotational speed change in the case of traveling of the vehicle on a rough road. FIGS. 6A and 6B show the rotational speed change in the case of exerting the slide resistance.

Furthermore, FIGS. 3A, 4A, 5A and 6A show the case where the delay load correction is performed, and FIGS. 3B, 4B, 5B and 6B show the case where the delay load correction is not performed.

As indicated in these drawings, when the delay load correction is made uniformly, a safety margin for limiting the erroneous sensing of the pinching is reduced to increase a chance of occurrence of the erroneous sensing of the pinching. That is, it becomes unduly sensitive to the pinching. Thus, in the present embodiment, the delay pulse signal number, which corresponds to the current external disturbance, is selected and is multiplied to the average rotational speed difference $\Delta\omega$ave to increase the safety margin for limiting the erroneous sensing of the pinching, and thereby the erroneous sensing of the pinching is effectively limited.

Thus, even when the vehicle door is opened or closed during the closing operation of the power window apparatus 1 for closing the window glass 11, the erroneous sensing of the pinching can be effectively limited.

Furthermore, in the present embodiment, the rotational speed change amount $\Sigma\Delta\omega\beta$ is used as an estimated pinching amount (also referred to as an estimated prior pinching amount), which is used to estimate the pinching state or the degree of pinching before the time of enabling the computation of the rotational speed change amount $\Sigma\Delta\omega\alpha$, which is the computed pinching amount.

That is, the rotational speed change amount $\Sigma\Delta\omega\beta$ is the pinching amount, which cannot be directly identified based on the operational state before the computation of the rotational speed change amount $\Sigma\Delta\omega\alpha$, which is identifiable based on the operational state.

The computed average rotational speed difference $\Delta\omega$ave changes depending on, for example, the hardness of the pinched object or the deformability of the pinched object. Therefore, the rotational speed change amount $\Sigma\Delta\omega\beta$, which is the estimated pinching amount, is set based on the characteristics of the object.

In the present embodiment, a summed pinching amount (a rotational speed change amount $\Sigma\Delta\omega t$) is used for the pinching determination. The summed pinching amount (a rotational speed change amount $\Sigma\Delta\omega t$) is obtained by summing the estimated pinching amount (the rotational speed change amount $\Sigma\Delta\omega\beta$), which would have actually influenced the rotational speed $\omega$ before the sensing of the start of the pinching, and the computed pinching amount (the rotational speed change amount $\Sigma\Delta\omega\alpha$), which is computed after the sensing of the start of the pinching.

That is, in the present embodiment, it is determined whether the rotational speed change amount $\Sigma\Delta\omega t$ exceeds the pinching determination threshold value $\beta$. When it is determined that the rotational speed change amount $\Sigma\Delta\omega t$ exceeds the pinching determination threshold value $\beta$, the pinching is sensed (confirmed).

Furthermore, in the present embodiment, the rotational speed change amount $\Sigma\Delta\omega\beta$, which is the estimated pinching amount, is computed by multiplying the pulse signal number, which corresponds to the delay period, to the average rotational speed difference $\Delta\omega$ave that is the average of the rotational speed differences obtained during the period from p pulses before to the current pulse. However, the present invention is not limited to this, and the estimated pinching amount may be computed by using an appropriate method in the context of the actual situation on the ground.

For example, the rotational speed change amount $\Sigma\Delta\omega\beta$ may be set in a stepwise manner according to the degree of the average rotational speed difference $\Delta\omega$ave. Furthermore, the pulse signal number may be variably set based on the degree of the average rotational speed difference $\Delta\omega$ave.

In the present embodiment, the change amount of the rotational speed $\omega$ is used as the pinching amount. However, the present invention is not limited to this, and any other appropriate change amount may be used as the pinching amount. For example, the change amount of the moving speed of the window glass 11 or the move change amount of the other mechanical portion may be used as the pinching amount.

Figure 7:
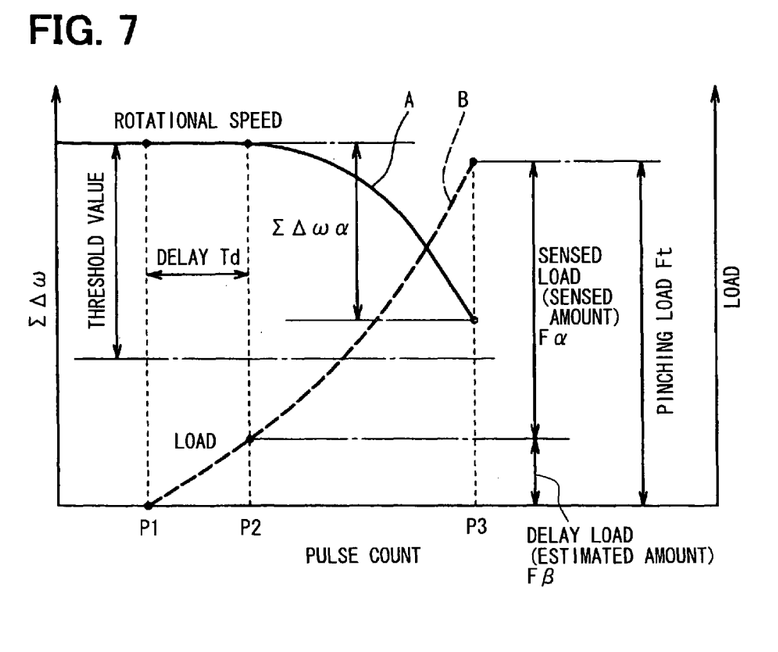
FIG. 7 is a diagram for describing a pinching determination operation performed upon consideration of an estimated pinching amount.

FIG. 7 shows the change in the rotational speed $\Sigma\Delta\omega$ (the cumulative value of the rotational speed differences $\Delta\omega$) and the change in the pinching load applied to the pinched object.

In FIG. 7, a solid line A indicates the change in the rotational speed $\Sigma\Delta\omega$, and a dotted line B indicates the change in the pinching load.

With reference to FIG. 7, the pinching starts at the time of the pulse count P1. The influence of the rotational speed reduction on the rotational speed $\Sigma\Delta\omega$ caused by the pinching appears at the time of the pulse count P2 after elapse of the delay period Td from the time of the pulse count P1.

However, in the example of FIG. 7, at the time of the pulse count P3 after the time of the pulse count P2, it is determined whether the pinching has occurred based on the rotational speed change amount $\Sigma\Delta\omega t$ that is obtained by adding the rotational speed change amount $\Sigma\Delta\omega\beta$, which is the estimated pinching amount, to the current rotational speed change amount $\Sigma\Delta\omega\alpha$.

Thus, at the time of the pulse count P3, the sum of the sensed pinching load F$\alpha$, which corresponds to the rotational speed change amount $\Sigma\Delta\omega\alpha$, and the delay load (the estimated pinching amount) F$\beta$, which corresponds to the rotational speed change amount $\Sigma\Delta\omega\beta$, is applied to the pinched object as the pinching load Ft.

In the case where the pinching is determined based on the rotational speed change amount $\Sigma\Delta\omega\alpha$, which has been obtained since the time of the pulse count P2 (at which the influence of the rotational speed reduction caused by the pinching is manifested), in view of the rotational speed change amount $\Sigma\Delta\omega\beta$, which is the estimated pinching amount before the time of the pulse count P2, the pinching can be determined based on the pinching amount, which corresponds to the value close to the pinching load actually applied to the pinched object. Therefore, it is possible to avoid the excessive application of the pinching load to the pinched object.

Furthermore, in the case where the soft object is pinched, the soft object is deformed at the beginning of the pinching, so that the pinching load does not substantially increase at the begging of the pinching. Thereafter, when the pinched object is deformed by a certain amount, the pinching load begins to increase. That is, at the beginning of the pinching, the influence of the pinching is not manifested on the rotational speed $\Sigma\Delta\omega$.

The lifting mechanism 2, which raises and lowers the window glass 11, has a play or looseness. Thus, at the beginning of the pinching, the reduction of the rotational speed $\Sigma\Delta\omega$ is absorbed by the play or the looseness of the lifting mechanism 2. Thereby, the manifestation of the influence of the pinching on the rotational speed $\Sigma\Delta\omega$ is delayed.

Thus, even when the object is pinched, the start of the pinching cannot be sensed until a certain time period (including, for example, the time period required for the object to deform and/or the time period required for absorption of the reduction of the rotational speed $\Sigma\Delta\omega$ by the play or the looseness of the lifting mechanism 2). Therefore, the time period from the time of starting the actual pinching of the object to the time of exceeding the rotational speed change amount $\Sigma\Delta\omega\alpha$ beyond the pinching determination threshold value $\beta$ becomes relatively long. During this period, the pinched object is kept in the pinched state.

However, in the present embodiment, the rotational speed change amount $\Sigma\Delta\omega\beta$, which is the pinching amount immediately before the sensing of the start of the pinching, is estimated. Then, the pinching is determined (confirmed) based on the sum of the rotational speed change amount $\Sigma\Delta\omega\alpha$ and the rotational speed change amount $\Sigma\Delta\omega\beta$. Therefore, the time of making the determination of the pinching is advanced by the amount, which corresponds to the addition of the rotational speed change amount $\Sigma\Delta\omega\beta$.

That is, the rotational speed change amount $\Sigma\Delta\omega\beta$ is the pinching amount, which cannot be directly identified based on the operational state before the computation of the rotational speed change amount $\Sigma\Delta\omega\alpha$, which is identifiable based on the operational state.

Thereby, in the present embodiment, the pinched object can be released from the pinched state in the early stage without holding the pinched object in the pinched state for the relatively long period of time.

Figure 8:
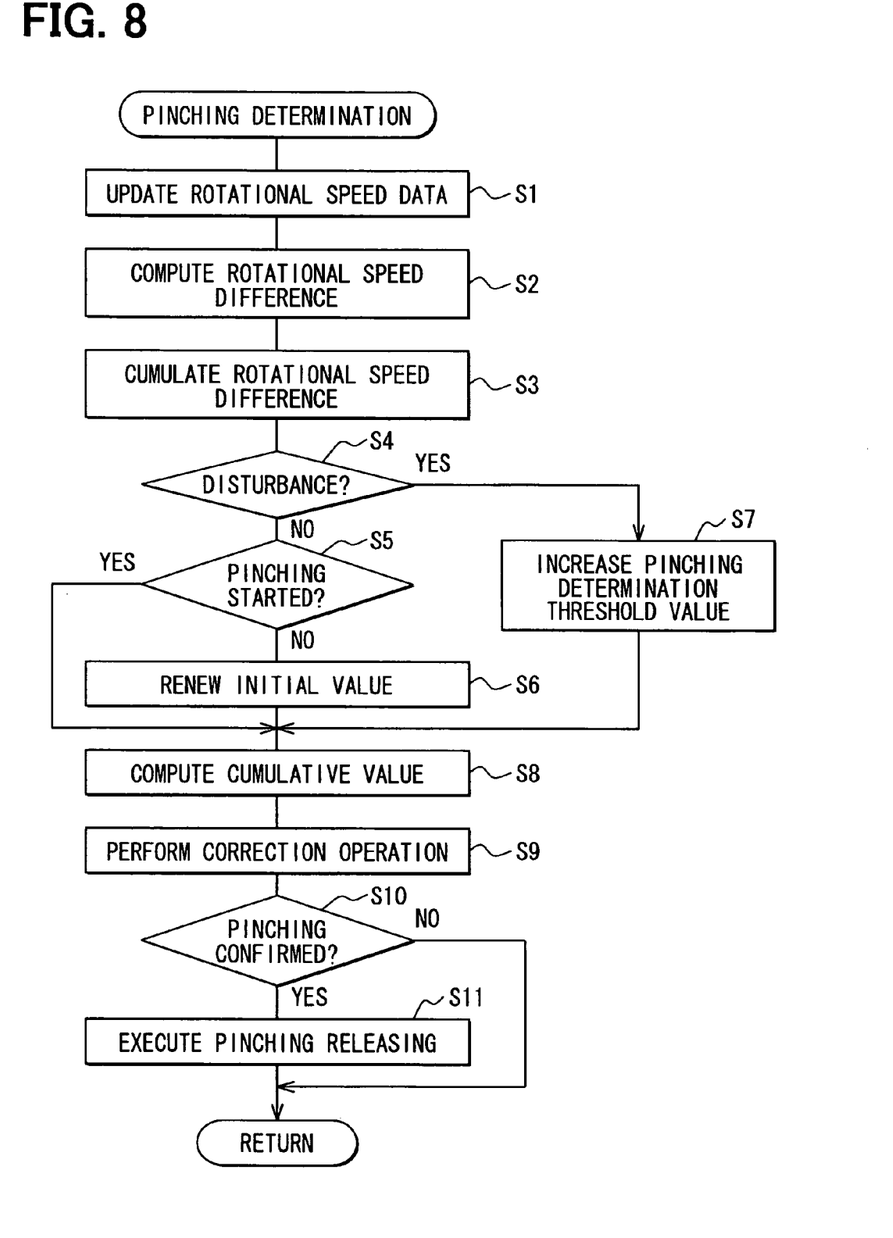
FIG. 8 is a flowchart showing the pinching determination operation.

Next, a pinching determination operation of the controller 31 of the present embodiment will be described with reference to FIGS. 8 to 10.

The external disturbances, which have the influence on the delay correction amount computation in the pinching determination operation of the power window apparatus 1, may include the ordinary disturbances, such as the slide resistance, the change caused by aging, the vehicle speed, operation of the electric devices (e.g., the starter, the wiper), the vibrations of the vehicle during traveling of the vehicle, the change in the drive voltage of the motor of the power window apparatus. In the following description of the present embodiment, the opening or closing movement of the vehicle door will be used as the external disturbance for the illustrative purpose.

First, at step S1, the controller 31 updates the rotational speed data of the motor 20 based on the pulse signals received from the rotation sensing device 25.

Specifically, the controller 31 senses the pulse edge through the signal processing of the pulse singles received from the rotation sensing device 25. Then, every time the pulse edge is sensed, the controller 31 computes a pulse width (a time interval) T between the previously sensed pulse edge and the currently sensed pulse edge and stores the computed pulse width T into the memory.

In the present embodiment, whenever the new pulse edge is sensed, the pulse width T is sequentially updated, so that the memory stores the latest four pulse widths $T(0)$ to $T(3)$.

Specifically, whenever the pulse edge is sensed, the pulse width $T(0)$ is newly computed, and the previously stored pulse widths $T(0)$ to $T(2)$ are shifted as the pulse widths $T(1)$ to $T(3)$ while the previously stored pulse width $T(3)$ is deleted from the memory.

Then, the controller 31 computes the rotational speed $\omega$ from an inverse of a sum (a pulse period P) of the pulse widths T of the pulse edges (the number of the pulse edges is n), which are sensed temporally continuously. This rotational speed $\omega$ is proportional to the actual rotational speed.

In the present embodiment, an average rotational speed $\omega(0)$ is computed from the pulse widths $T(0)$ to $T(3)$ of the latest four pulse edges. Then, when the next pulse edge is sensed, the rotational speed $\omega(0)$ is updated based on the newly computed pulse widths $T(0)$ to $T(3)$. At this time, the previous rotational speed $\omega(0)$ is stored as the rotational speed $\omega(1)$.

In this way, the controller 31 always stores the latest eight rotational speeds $\omega(0)$ to $\omega(7)$, which are renewed every time the new pulse edge is sensed, i.e., are renewed at every predetermined moving distance or at every predetermined rotational angle. When the rotational speed $\omega$ is computed based on the multiple pulse widths T, it is possible to substantially eliminate variations in the sensor Duty of the respective received pulse signal outputs, and thereby it is possible to compute the rotational speed, from which the erroneous changes are substantially eliminated.

Furthermore, in the present embodiment, the rotational speed $\omega$ is computed based on the pulse widths $T(0)$ to $T(3)$. Alternatively, the rotational speeds (the total number of the rotational speeds is m), which are computed sequentially in the above described manner, may be averaged to provide the average rotational speed $\omega$.

Next, the controller 31 computes the rotational speed difference (rotational speed change rate) $\Delta\omega(0)$ from the rotational speed $\omega$ at step S2.

Specifically, the latest four rotational speeds $\omega(0)$ to $\omega(3)$ are named as current block data and are summed to obtain a sum of the current block data, and the older four rotational speeds $\omega(4)$ to $\omega(7)$ are named as previous block data and are summed to obtain a sum of the previous block data. Then, the sum of the current block data is subtracted from the sum of the previous block data.

Specifically, the rotational speed difference $\Delta\omega$ is computed by subtracting the sum of the rotational speeds $\omega(0)$ to $\omega(3)$ from the sum of the rotational speeds $\omega(4)$ to $\omega(7)$ and is updated every time the pulse edge is sensed, i.e., at every predetermined moving distance or at every predetermined rotational angle. Thereby, the rotational speed differences $\Delta\omega(0)$ to $\Delta\omega(q)$ are sequentially updated. Here, "q" is equal to or greater than "p" (i.e., q>p).

Alternatively, the computed value (sum of the rotational speeds) may be divided by the number (four in the present embodiment) of the computed rotational speeds in each block data. By computing the rotational speed difference $\Delta\omega$ based on the multiple rotational speeds $\omega$, phase differences among the rotational speeds $\omega$ can be canceled.

Then, while a predetermined position of the window glass 11 is used as a reference, the controller 31 adds (cumulates) the computed rotational speed difference $\Delta\omega(0)$ to compute the rotational speed change amount $\Sigma\Delta\omega$ at step S3. As discussed above, every time the rotational speed difference $\Delta\omega(0)$ is updated, this updated rotational speed difference $\Delta\omega(0)$ is accumulated to compute the difference of the rotational speed $\omega$ relative to the reference position.

Then, it is determined whether the computed rotational speed difference $\Delta\omega(0)$ exceeds the disturbance determination threshold value $\gamma$ on the positive side at step S4.

When a tire of the vehicle hits a bump or when the window glass 11 is closed, a shock may be applied to the window glass 11 due to such an external disturbance and may influence the rotational speed of the motor 20.

In the present embodiment, the erroneous sensing of the pinching caused by the external disturbance is limited by the above operation.

Figure 9:
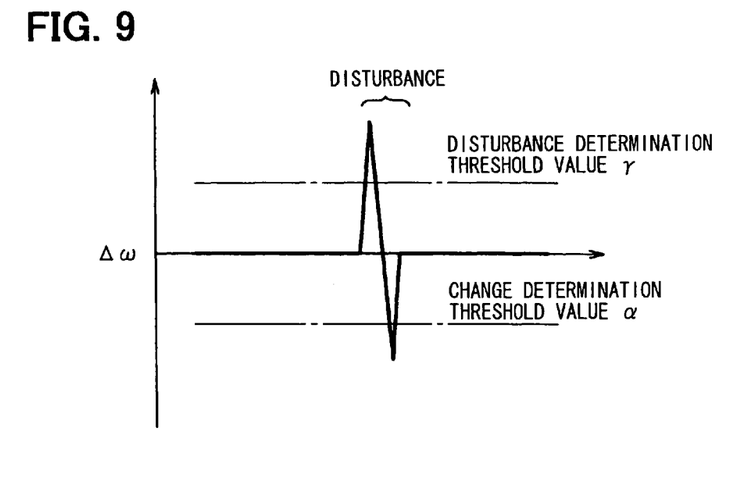
FIG. 9 is a diagram showing a rotational speed difference at the time of occurrence of an external disturbance.

As shown in FIG. 9, when the external disturbance is applied, the rotational speed difference $\Delta\omega$ normally becomes the large values on both of the positive side and the negative side.

When the rotational speed difference $\Delta\omega$ is shifted to the positive side, it indicates that the rotation of the motor 20 is accelerated in the closing direction of the window glass 11. In contrast, when the rotational speed difference $\Delta\omega$ is shifted to the negative side, it indicates that the rotation of the motor 20 is decelerated.

Thus, the shift of the rotational speed difference $\Delta\omega$ to the negative side resembles occurrence of the pinching. Here, the disturbance determination threshold value $\gamma$ is the positive value. When the rotational speed difference $\Delta\omega$ exceeds the disturbance determination threshold value $\gamma$ on the positive side, the controller 31 determines that the disturbance has occurred.

When it is determined that the disturbance has occurred at step S4 (i.e., YES at step S4), the controller 31 increase the pinching determination threshold value $\beta$ on the negative side at step S7. Thereafter, the controller 31 proceeds to step S8.

In this way, even when the rotational speed difference $\Delta\omega$ is shifted to the negative side due to the external disturbance to cause the erroneous sensing of the start of the pinching, the erroneous determination of the pinching can be limited since the cumulative value of the rotational speed differences $\Delta\omega$ thereafter does not exceed the increased pinching determination threshold value.

In the present embodiment, the disturbance determination threshold value $\gamma$ is set regardless of a change determination threshold value $\alpha$. Alternatively, for example, the disturbance determination threshold value $\gamma$ may be set to a value, which is obtained by reversing the sign (+/−) of the change determination threshold value $\gamma$.

When it is determined that the disturbance has not occurred at step S4 (i.e., NO at step S4), the controller 31 executes a pinching start determination operation at step S5.

Specifically, when the rotational speed difference $\Delta\omega(0)$ exceeds the change determination threshold value $\alpha$ on the negative side, it is determined that the pinching has started. In contrast, when the rotational speed difference $\Delta\omega(0)$ does not exceed the change determination threshold value $\alpha$ on the negative side, it is determined that the pinching has not started.

When it is determined that the pinching has started at step S5 (i.e., YES at step S5), the controller 31 proceeds to step S8.

In contrast, when it is determined that the pinching has not started at step S5 (i.e., NO at step S5), the controller 31 proceeds to step S6. At step S6, the cumulative value of the rotational speed differences $\Delta\omega$ is initialized, and also the pinching determination threshold value $\beta$ is initialized.

Specifically, the rotational speed change amount $\Sigma\Delta\omega$, which is computed at step S3, is set to an initial change amount S0 of the rotational speed $\omega$, and the pinching determination threshold value $\beta$ is returned to a normal value, which has not been increased at all.

When it is determined that the period of external disturbance is over, the pinching determination threshold value $\beta$ is returned to the normal value, and the normal operation is performed.

Then, at step S8, the cumulative value is computed. This is the computation process of the change amount S of the rotational speed $\omega$. Here, the amount, which corresponds to the pinching amount (the rotational speed change amount $\Sigma\Delta\omega\alpha$) after the determination of the start of the pinching, is computed.

Specifically, the controller 31 computes the change amount S of the rotational speed $\omega$ by subtracting the cumulative value of the rotational speed differences $\Delta\omega$, which is computed at step S3, from the initial change amount S0 of the rotational speed $\omega$ (the cumulative value of the rotational speed differences $\Delta\omega$), which is set at step S6, immediately before the determination of the start of the pinching.

Thus, when it is not determined that the pinching has started at step S5, the change amount S of the rotational speed $\omega$, which is computed at step S8, becomes zero. In contrast, when it is determined that the pinching has started at step S5, the change amount S of the rotational speed $\omega$, which is computed at step S8, becomes the change amount of the rotational speed $\omega$ since the time of starting of the pinching.

As described above, the controller 31 of the control unit 3 serves as a pinching amount computing means.

In the present embodiment, the difference of the change amount from the reference value is computed to compute the change amount of the rotational speed $\omega$ (the rotational speed change amount $\Sigma\Delta\omega\alpha$) since the start of the pinching. However, the present invention is not limited to this. For example, when the start of the pinching is not sensed, the cumulative value of the rotational speed differences $\Delta\omega$ may be initialized. In contrast, when the start of the pinching is sensed, the initialization of the cumulative value of the rotational speed differences $\Delta\omega$ may be prohibited. In this way, only the rotational speed differences $\Delta\omega$, which are obtained since the time of sensing the start of the pinching, are cumulated, and the change amount of the rotational speed $\omega$ (the rotational speed change amount $\Sigma\Delta\omega\alpha$) may be computed based on this cumulative value of the rotational speed differences $\Delta\omega$.

Figure 10:
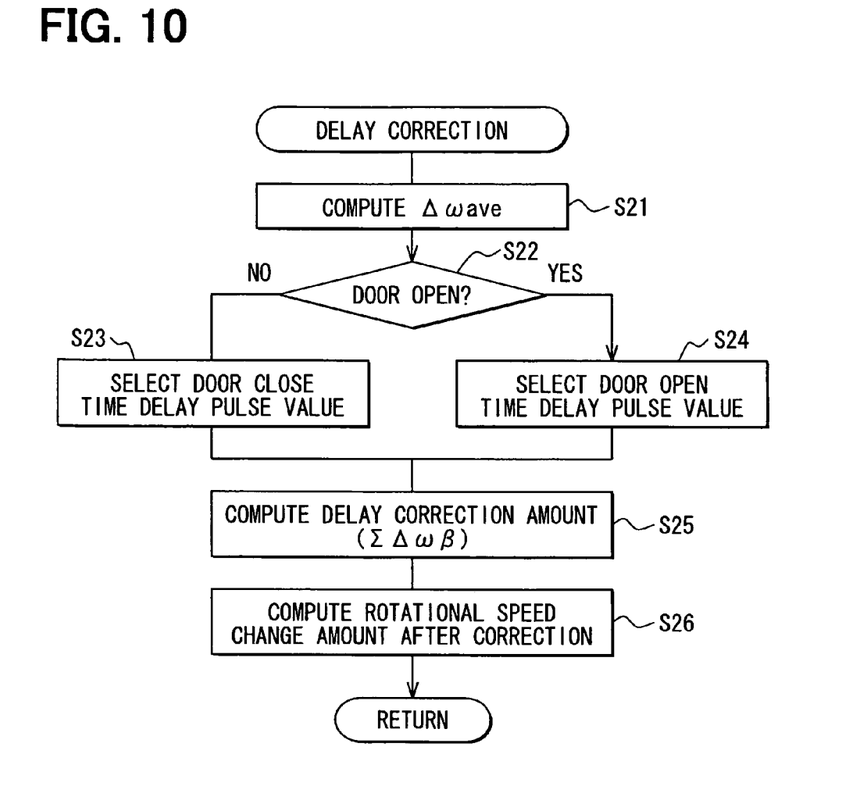
FIG. 10 is a flowchart showing a delay correction operation for correcting a rotational speed change amount.

Next, at step S9, the controller 31 performs a correction operation for correcting the change amount S of the rotational speed $\omega$ in view of the estimated pinching amount in the delay period Td before the determination of the start of the pinching (see FIG. 10).

In this operation, at step S21, there is computed the average rotational speed difference $\Delta\omega$ave, which is the average value of the rotational speed differences $\Delta\omega$ from the current rotational speed difference $\Delta\omega(0)$ to the previous rotational speed difference $\Delta\omega(p)$. Here, the previous rotational speed difference $\Delta\omega(p)$ is the rotational speed difference, which is computed p pulse edges before the current pulse edge. Then, this average rotational speed difference $\Delta\omega$ave is regarded as the rotational speed difference in the delay period Td.

Then, at step S22, it is determined whether the door is open. This determination is made based on the door signal, which is supplied from the door signal source 6 to the controller 31.

As discussed above, the door signal source 6 may be, for example, the courtesy switch, the door latch sensor, any other known contact or contactless sensor provided at the door 10. The controller 31 determines whether the door is open (in the open state) or closed (in the close state) based on the door signal. Thereby, the door signal source 6 serves as a door state sensing means for sensing the open state or the close state of the door.

When it is determined that the door is closed at step S22 (i.e., NO at step S22), the operation proceeds to step S23. At step S23, a door close time delay pulse value is selected. Then, at step S25, the delay correction amount is computed.

In contrast, when it is determined that the door is open at step S22 (i.e., YES at step S22), a door open time delay pulse value is selected. Then, at step S25, the delay correction amount is computed.

At step S25, the preset delay pulse signal number (the door open time delay pulse value or the door close time delay pulse value), which is selected at step S23 or step S24, is multiplied to the average rotational speed difference $\Delta\omega$ave, which is computed at step S21, to obtain the rotational speed change amount $\Sigma\Delta\omega\beta$, which is the estimated pinching amount in the delay period Td.

As described above, the controller 31 of the control unit 3 serves as a pinching amount estimating means for estimating the pinching amount of the object.

Upon the computation of the rotational speed change amount $\Sigma\Delta\omega\beta$, the operation proceeds to step S26. At step S26, the correction is made by adding the rotational speed change amount $\Sigma\Delta\omega\beta$ to the change amount S of the rotational speed ω, which is computed at step S8. In this way, the substantial change of the rotational speed caused by the pinching (i.e., the change caused by the pinching load) can be reliably computed.

Then, at step S10, the controller 31 determines whether the change amount S of the rotational speed ω, which is computed at step S9, exceeds the pinching determination threshold value β.

As described above, the controller 31 of the control unit 3 serves as the pinching determining means.

When it is determined that the change amount S of the rotational speed ω exceeds the pinching determination threshold value β at step S10 (i.e., YES at step S10, thereby confirming the pinching), the controller 31 proceeds to step S11. At step S11, the controller 31 executes the pinching releasing operation to release the pinched object from the window glass 11. Then, the controller 31 terminates the operation.

Specifically, in the pinching releasing operation, the controller 31 rotates the motor 20 in the reverse direction to lower the window glass 11 for a predetermined amount to release the pinched object from the window glass 11.

In contrast, when it is determined that the change amount S of the rotational speed ω does not exceed the pinching determination threshold value β at step S10 (i.e., NO at step S10), the controller 31 terminates the process without proceeding further.

In the above embodiment, the change determination threshold value α, the pinching determination threshold value β and the disturbance determination threshold value γ are set as the constant values regardless the position of the window glass 11. However, the present invention is not limited to this. That is, the change determination threshold value α, the pinching determination threshold value β and the disturbance determination threshold value γ may be changed according to the position of the window glass 11.

Furthermore, in the above embodiment, the closure panel control apparatus of the present invention is applied to the power window apparatus 1 of the vehicle. Alternatively, the closure panel control apparatus of the present invention may be implemented to open and close a closure panel of any other apparatus, such as a sunroof opening and closing apparatus, a slide door opening and closing apparatus.

As described above, in the present embodiment, the threshold value for the external disturbance is corrected, and the rotational speed is corrected to correct the change amount of the rotational speed caused by the delay.

Furthermore, as discussed above, the system for making the more precise correction is established, so that the more reliable sensing of the pinching can be performed.

Additional advantages and modifications will readily occur to those skilled in the art. The invention in its broader terms is therefore not limited to the specific details, representative apparatus, and illustrative examples shown and described.

What is claimed is:

1. A closure panel control apparatus for a vehicle, comprising:
    a door;
    a closure panel that is provided to the door;
    a drive unit that drives the closure panel to open and close the closure panel;
    a door state sensing means for sensing a current state of the door, which is one of an open state and a closed state of the door, and
    a pinching sensing unit that senses pinching of an object caused by the closure panel at time of driving the closure panel by the drive unit, the pinching sensing unit including:
        a pinching amount computing means for computing a pinching amount of the object caused by the closure panel;
        a pinching amount estimating means for estimating a prior pinching amount of the object caused by the closure panel before the pinching amount computing means computes the pinching amount of the object; and
        a pinching determining means for confirming occurrence of the pinching of the object based on the computed pinching amount, which is computed by the pinching amount computing means, and the estimated prior pinching amount of the object, which is estimated by the pinching amount estimating means, the pinching determining means confirming the occurrence of the pinching of the object when a sum of the computed pinching amount and the estimated prior pinching amount of the object exceeds a pinching determination threshold value, wherein:
    the pinching amount estimating means determines whether generation of an external disturbance exists at the time of driving the closure panel by the drive unit;
    when the pinching amount estimating means determines that the generation of the external disturbance exists at the time of driving the closure panel, the pinching determining means changes the pinching determination threshold value based on the external disturbance; and
    when the pinching amount estimating means determines that the generation of the external disturbance exists at the time of driving the closure panel, the pinching amount estimating means corrects the estimated prior pinching amount of the object based on the sensed external disturbance and corrects the computed pinching amount of the object, which is computed by the pinching amount computing means, based on the sensed current state of the door.

2. The closure panel control apparatus according to claim 1, wherein:
    a drive source of the drive unit is an electric motor; and
    the external disturbance is a change in a drive voltage of the motor.

3. The closure panel control apparatus according to claim 1, wherein:
    a drive source of the drive unit is an electric motor; and
    the external disturbance is a change in a rotational speed of the electric motor caused by vibrations applied to the vehicle during traveling of the vehicle.

4. The closure panel control apparatus according to claim 1, wherein
    the external disturbance is a slide resistance of the closure panel.

5. The closure panel control apparatus according to claim 1, wherein:
    the closure panel is a window glass provided to the door; and
    he external disturbance is an opening or closing movement of the door.

6. The closure panel control apparatus according to claim 1, further comprising
    a moving speed sensing means for outputting a speed measurement signal, which indicates a moving speed that corresponds to movement of the closure panel driven by the drive unit, wherein:

the pinching amount computing means computes the pinching amount of the object based on the speed measurement signal only after start of the pinching of the object is sensed based on an amount of change in the moving speed per unit interval; and
the pinching amount estimating means estimates the prior pinching amount of the object for a predetermined time period, which is before time of sensing the start of the pinching of the object, based on the measurement signal.

7. The closure panel control apparatus according to claim 6, wherein
the predetermined time period is set in view of a delay in the time of sensing the start of the pinching from actual time of pinching of the object.

* * * * *